(12) United States Patent
Sevier et al.

(10) Patent No.: US 7,709,078 B1
(45) Date of Patent: May 4, 2010

(54) DISK DRIVE HOUSING HOLE SEAL INCLUDING A CONDUCTIVE LAYER WITH AN EXPOSED PLANAR SURFACE REGION

(75) Inventors: Claire-Nechol Sevier, Hayward, CA (US); Huynh P. Tan, San Jose, CA (US); Julius A. Turangan, Livermore, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 610 days.

(21) Appl. No.: 11/607,716

(22) Filed: Dec. 1, 2006

(51) Int. Cl.
*B32B 3/24* (2006.01)
*G11B 33/14* (2006.01)

(52) U.S. Cl. .................. 428/138; 428/192; 428/343; 428/344; 428/354; 360/97.01; 360/97.02

(58) Field of Classification Search ............ 428/138, 428/192, 343, 344, 354; 360/97.01, 97.02
See application file for complete search history.

(56) References Cited

U.S. PATENT DOCUMENTS 4,561,232 A * 12/1985 Gladden et al. ............ 52/385
5,270,887 A    12/1993 Edwards et al.
5,276,577 A     1/1994 Brooks et al.
5,670,254 A     9/1997 Akhter
5,958,537 A     9/1999 Akhter
6,822,823 B1   11/2004 Tsuwako et al.
6,903,898 B2    6/2005 Nonaka et al.
2004/0009328 A1 * 1/2004 Kung .................. 428/138

OTHER PUBLICATIONS

Donaldson Disk Drive Contamination Control, Product Guidelines & Specifications, Disk Drive Seals, Donaldson Filtration Solutions, DDS.7/04, 2 pages.

* cited by examiner

Primary Examiner—William P Watkins, III

(57) ABSTRACT

There is provided a seal for covering a hole in a disk drive housing. The seal includes a conductive layer, a primary dielectric layer, and a gasket layer. The conductive layer has a covered surface region and an exposed planar surface region. The exposed planar surface region is lacking a dielectric coating disposed thereon. The primary dielectric layer includes an adhesive coating disposed between the primary dielectric layer and the covered surface region. The gasket layer includes first and second adhesive gasket layer sides and a gasket opening disposed through the gasket layer.

14 Claims, 5 Drawing Sheets

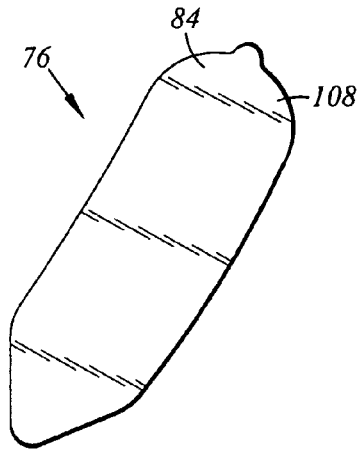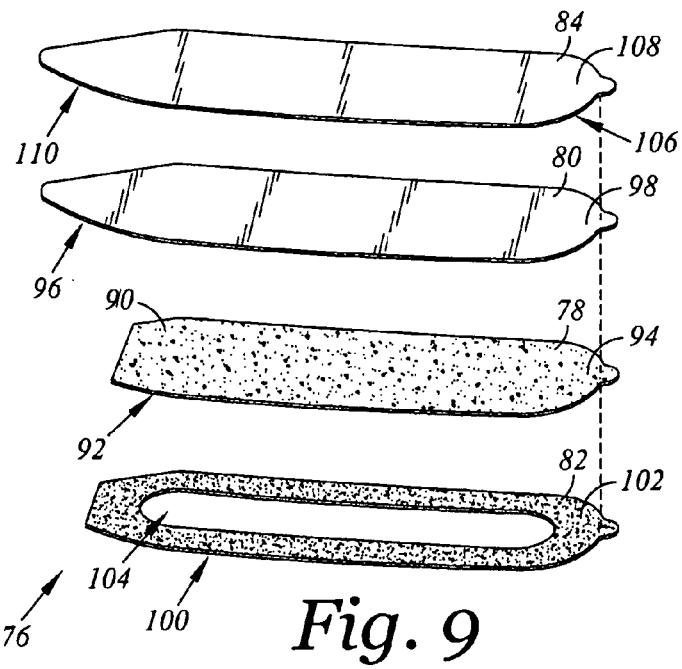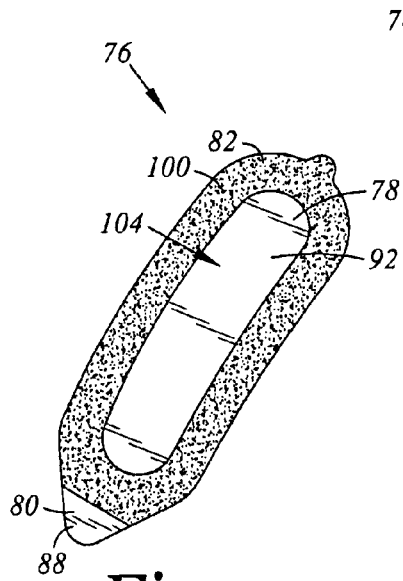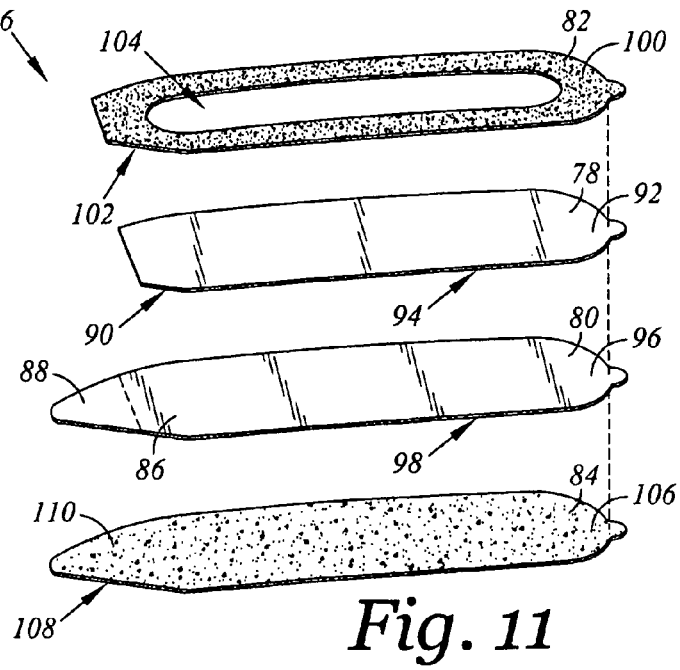

DISK DRIVE HOUSING HOLE SEAL INCLUDING A CONDUCTIVE LAYER WITH AN EXPOSED PLANAR SURFACE REGION

FIELD OF THE INVENTION

The present invention relates generally to disk drives, and in particular a disk drive housing hole seal.

BACKGROUND

The typical hard disk drive includes a head disk assembly (HDA) and a printed circuit board assembly (PCBA) attached to a disk drive base of the RDA. The head disk assembly includes at least one disk (such as a magnetic disk, magneto-optical disk, or optical disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. In an optical disk drive, the head will typically include a mirror and objective lens for reflecting and focusing a laser beam on to a surface of the disk. The head stack assembly is controllably positioned in response to the generated servo control signals from the disk controller. In so doing, the attached heads are moved relative to tracks disposed upon the disk.

A hole may be formed through the disk drive base. The hole may be utilized to provide access to the disk once the disk drive is assembled. For example, the disk may be accessed for writing servo control data onto the disk. In order to prevent contamination from entering the disk drive a seal is disposed over the hole. The seal typically includes a metal layer that is attached to the disk drive base with a pressure sensitive adhesive. The metal layer is used to block particulate matter and also serves as a vapor barrier.

The action of peeling a flexible planar insulative layer off a planar surface may cause the insulative layer to become charged with one polarity while the planar surface would attain a potential of opposite polarity. This phenomenon is called tribocharging or triboelectrification. As such, static electricity may be generated during the removal of a seal from its backing just prior to installation. Static electricity may also be generated during removal of a seal from the disk drive housing. Because the surfaces are insulative, these charges may not be dissipated and have the possibility to build to an eventual undesirable discharge. Such a discharge can damage sensitive electrical components within a disk drive.

Accordingly, it is contemplated that there is need in the art for a seal for use with a disk drive housing hole that is more likely to mitigate electrostatic discharge events.

SUMMARY

According to an aspect of the present invention, there is provided a seal for covering a hole in a disk drive housing. The seal includes a conductive layer, a primary dielectric layer, and a gasket layer. The conductive layer has a covered surface region and an exposed planar surface region. The exposed planar surface region is lacking a dielectric coating disposed thereon. The primary dielectric layer includes an adhesive coating disposed between the primary dielectric layer and the covered surface region. The gasket layer includes first and second adhesive gasket layer sides and a gasket opening disposed through the gasket layer.

BRIEF DESCRIPTION OF THE DRAWINGS

FIG. 8 is an enlarged exploded top perspective view of a seal according to an embodiment of the present invention;

FIG. 9 is an enlarged exploded bottom perspective view of a seal according to an embodiment of the present invention;

FIG. 10 is a top plan view of a seal according to an embodiment of the present invention; and FIG. 11 is a bottom plan view of a seal according to an embodiment of the present invention.

DESCRIPTION OF THE PREFERRED EMBODIMENTS

Figure 1:
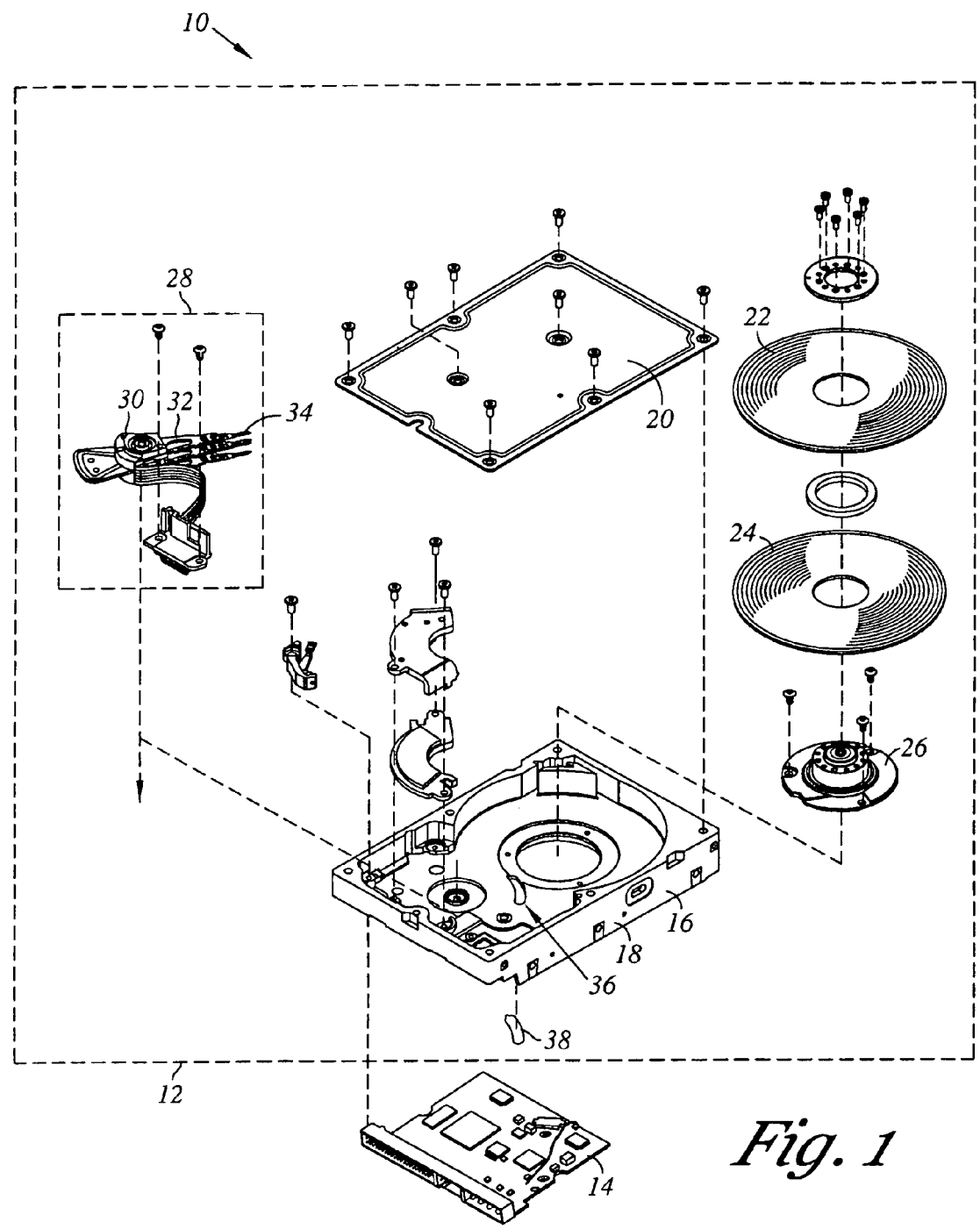
FIG. 1 is an exploded top perspective view of a disk drive including a disk drive housing and a seal according to an embodiment of the present invention.

Referring now to FIG. 1 there is depicted an exploded top perspective view of a disk drive 10 suitable for use with an embodiment of the present invention. The disk drive 10 includes a head disk assembly (HDA) 12 and a printed circuit board assembly (PCBA) 14. The head disk assembly 12 includes a disk drive housing 16 having disk drive housing members, such as a disk drive base 18 and a cover 20. The disk drive base 18 and the cover 20 collectively house disks 22, 24. A single disk or additional disks may be utilized. Each of the disks 22, 24 includes a plurality of tracks for storing data. Each of the disks 22, 24 may be of a magnetic recording type of storage device, however, other arrangements such as optical recording may be utilized. The head disk assembly 12 further includes a spindle motor 26 for rotating the disks 22, 24. The head disk assembly 12 further includes a head stack assembly 28 rotatably attached to the disk drive base 18 in operable communication with the disks 22, 24. The head stack assembly 28 includes an actuator 30.

The actuator 30 includes actuator arms 32 (for ease of illustration only the topmost one is labeled). Distally attached to the actuator arms 32 are suspension assemblies that respectively support heads 34 (for ease of illustration only the topmost one is labeled). The suspension assemblies with the heads 34 are referred to as head gimbal assemblies. It is contemplated that the number of actuator arms and suspension assemblies may vary depending upon the number of disks and disk surfaces utilized.

Each head 34 typically includes a transducer for writing and reading data. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of a given one of the disks 22, 24. Each of the disks 22, 24 includes opposing disk surfaces. In magnetic recording applications the disk surface typically includes one or more magnetic layers. Data may be recorded along data annular regions on a single disk surface or both.

The head stack assembly 28 may be pivoted such that each head 34 is disposed adjacent to various data annular regions of the disks 22, 24. The head stack assembly 28 is disposed in electrical communication with the printed circuit board assembly to facilitate electrical signals between the heads 34 and the printed circuit board assembly 14.

Figure 2:
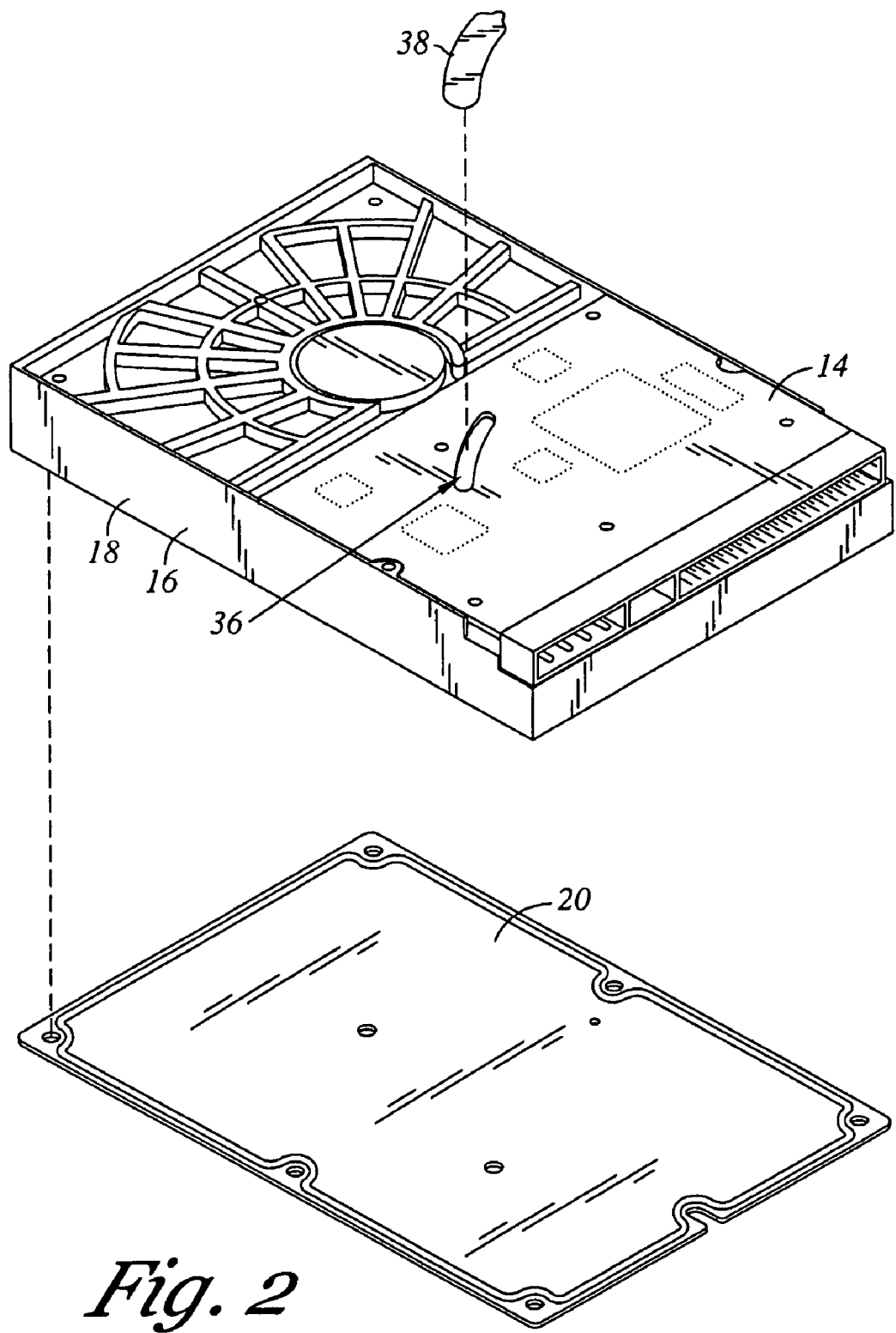
FIG. 2 is a bottom perspective view of a disk drive with a cover and a seal exploded away from the disk drive according to an embodiment of the present invention.

The disk drive housing 16 includes a hole 36. In this embodiment, the hole 36 is disposed through the disk drive base 18. As will be discussed in further detail below, the disk drive 10 may further include a seal 38. The hole 36 may be utilized to provide access to the disk 24 once the disk drive 10 is assembled. For example, the disk 24 may be accessed for writing servo control data onto the disk 24. FIG. 2 is a bottom perspective view of the disk drive 10 with the cover 20 and the seal 38 exploded away from the disk drive 10. In order to prevent contamination from entering the disk drive a seal 38 is disposed over the hole 36. However, it is desirable to mitigate electrostatic discharge events should the seal 38 ever be removed. This may be the case where the disk drive 10 requires rework of its internal components.

Figure 3:
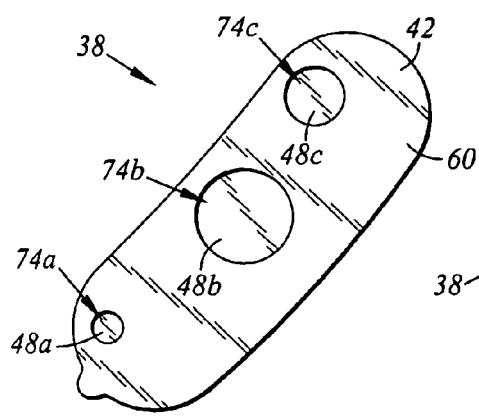
FIG. 3 is an enlarged exploded top perspective view of a seal according to an embodiment of the present invention.
Figure 4:
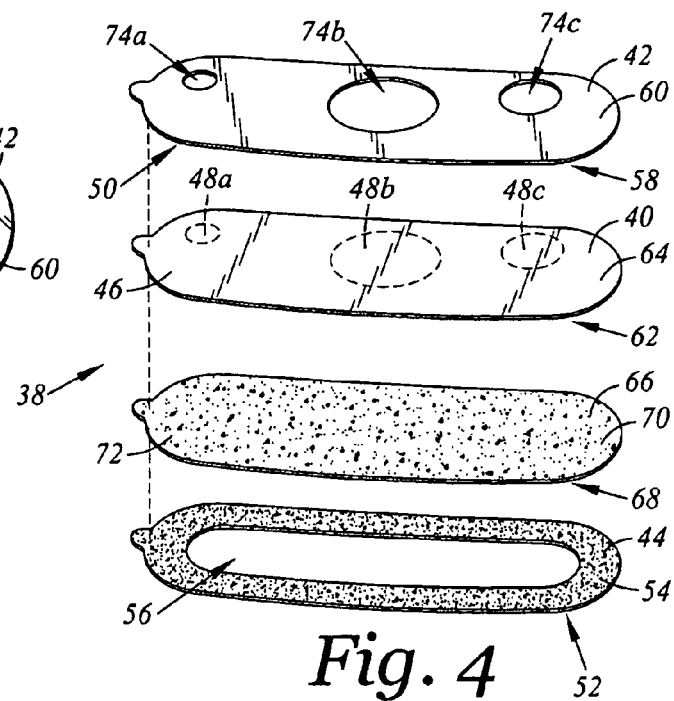
FIG. 4 is an enlarged exploded bottom perspective view of a seal according to an embodiment of the present invention.
Figure 5:
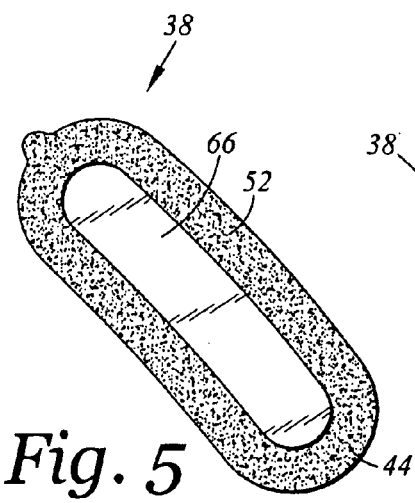
FIG. 5 is a top plan view of a seal according to an embodiment of the present invention.
Figure 6:
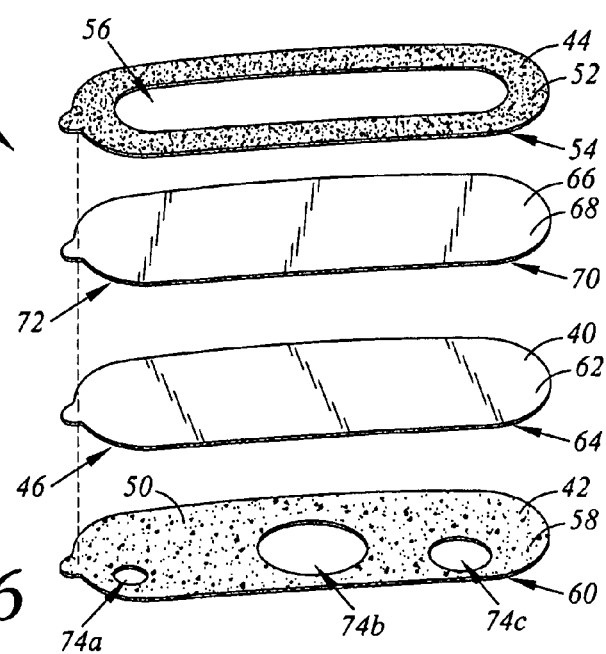
FIG. 6 is a bottom plan view of a seal according to an embodiment of the present invention.

Referring additionally to FIGS. 3 and 4, there are respectively depicted enlarged exploded top and bottom perspective views of the seal 38. FIGS. 5 and 6 respectively depict top and bottom plan views of the seal 38.

The seal 38 includes a conductive layer 40, a primary dielectric layer 42, and a gasket layer 44. The conductive layer 40 has a covered surface region 46 and an exposed planar surface region 48. The exposed planar surface region 48 is lacking a dielectric coating disposed thereon. The primary dielectric layer 42 includes an adhesive coating 50 disposed between the primary dielectric layer 42 and the covered surface region 46. The gasket layer 44 includes first and second adhesive gasket layer sides 52, 54 and a gasket opening 56 disposed through the gasket layer 44.

In certain embodiments, the conductive layer 40 is disposed between the primary dielectric layer 42 and the gasket layer 44 such as depicted in FIGS. 3-6. The primary dielectric layer 42 has a first and second primary dielectric layer sides 58, 60. The conductive layer 40 has first and second conductive layer sides 62, 64. The adhesive coating 50 is disposed at the first primary dielectric layer side 58. As such, the first primary dielectric layer side 58 is attached to the second conductive layer side 64 with the adhesive coating 50. In the embodiment of FIG. 4, the seal 38 further includes a secondary dielectric layer 66. The secondary dielectric layer 66 is disposed between the conductive layer 40 and the gasket layer 44. The secondary dielectric layer 66 has first and second sides 68, 70. The secondary dielectric layer 66 may include an adhesive coating 72 between the secondary dielectric layer 66 and the conductive layer 40. The adhesive coating 72 is disposed at the second side 70. As such, the second side 70 is attached to the first conductive layer side 62 with the adhesive coating 72.

In certain embodiments, the primary dielectric layer 42 may be attached to the secondary dielectric layer 66 via the intermediate disposition of the conductive layer 40. Further, the primary dielectric layer 42 may be attached to the second adhesive gasket layer side 54. In the embodiment of FIG. 4, the primary dielectric layer 42 is attached to the second adhesive gasket layer side 54 via the intermediate disposition of the secondary dielectric layer 66 and the conductive layer 40.

The primary dielectric layer 42 may have a primary dielectric layer opening 74. In the embodiment depicted, the primary dielectric layer 42 has a plurality of primary dielectric layer openings, individually labeled 74a-c. The primary dielectric layer openings 74a-c may be of a variety of shapes, geometries and locations, such as the holes through the primary dielectric layer 42 depicted in this embodiment. The exposed planar surface region 48 may be aligned within the primary dielectric layer opening 74. In the embodiment of FIG. 4, the exposed planar surface region 48 includes a plurality of sections, individually denoted 48a-c. Respective ones of the sections 48a-c may be aligned within the primary dielectric layer openings 74a-c.

The conductive layer 40 may comprise a variety of materials such as a metal (e.g. aluminum, stainless steel, copper). The conductive layer 40 may take the form of a thin sheet of material. The conductive layer 40 may be formed through a stamping process.

The primary and secondary dielectric layers 42, 66 may comprise a polymer material. In this regard, the primary and secondary dielectric layers 42, 66 may be adhesive tape comprising a thin sheet of polymer material with a pressure sensitive adhesive disposed upon one or both of its sides.

The gasket layer 44 may comprise a laminated adhesive material. The gasket layer 44 may be a double sided adhesive tape comprising a thin sheet of polymer material with pressure sensitive adhesive disposed upon both sides.

The gasket opening 56 is sized to be disposed about the hole 36 of the disk drive housing 16. The first adhesive gasket layer side 52 is disposed about the hole 36 upon the disk drive base 18. The adhesive nature of the first adhesive gasket layer side 52 facilitates attachment of the seal 38 to the disk drive base 18.

The primary dielectric layer 42, the conductive layer 40, the secondary dielectric layer 66, and the gasket layer 44 may have a variety of thicknesses. For example, the primary dielectric layer 42 may have a thickness between 13 and 250 microns. The conductive layer 40 may have a thickness between 20 and 50 microns. The secondary dielectric layer 66 may have a thickness between 13 and 250 microns. The gasket layer 44 may have a thickness between 35 and 220 microns. Moreover, each of the primary dielectric layer 42, the conductive layer 40, the secondary dielectric layer 66, and the gasket layer 44 may have uniform or non-uniform thickness. In addition, such layers may be of a variety of shapes.

Figure 7:
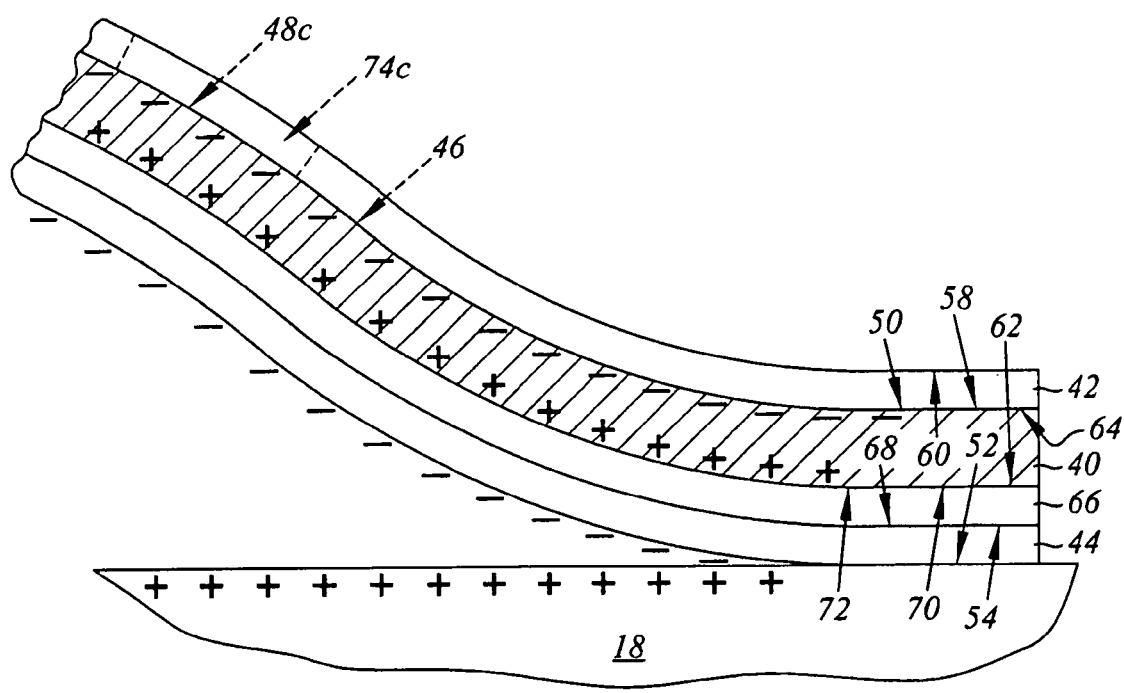
FIG. 7 is an enlarge side view of a portion of a seal as being partially removed from a disk drive housing.

Referring now to FIG. 7 there is depicted a cross sectional side view of a portion of the seal 38 as being peeled away from the disk drive base 18. In this embodiment, the disk drive base 18 may be provided with an insulative surface coating. Such a peeling action through triboelectrification may result in the generation of charges in and about the seal 38. Positive charges may develop at the surface of the disk drive base 18 where the seal 38 has been peeled away. Opposite polarity charges (negative charges in this example) are generated upon a surface of the first adhesive gasket layer side 52. Because the conductive layer 40 is disposed between two insulative layers (the primary and secondary dielectric layers 42, 66) charge separation occurs in the conductive layer 42. Note that within conductive material such as a metal, charges (electrons) are able to move relatively freely. Prior to the peeling action, it can be assumed that the conductive layer 42 is relatively electrically neutral. However, with the generation of the charges at the first adhesive gasket layer side 52 adjacent the secondary dielectric layer 66, positive charges are attracted towards the secondary dielectric layer 66 while negative charges are repelled.

The positive charges in the conductive layer 40 become held in an electric field created by the negative charges in the secondary dielectric layer 66 (such charges in this state are referred to as immobile charges). The negative charges in the conductive layer 40, however, are relatively free to move (such charges in this state are referred to as mobile charges).

If the peeling action of the seal 38 were to simply continue until the seal 38 is removed, just prior to separation from the disk drive base 18 the seal 38 would have the edge of the conductive layer 40 exposed towards the disk drive base 18. The electric potential difference between the seal 38 (which would carry a negative charge) and the disk drive base 18 (which would carry a neutral or positive charge) may become large enough that negative charges in the conductive layer 40 jump the air gap between the seal 38 and the disk drive base 18 causing an electrostatic discharge event.

The exposed planar surface region 48 provides a contact for an electrical connection to the conductive layer 40. During the peeling action of the removal process of the seal 38 from the disk drive base 18, a grounded person (e.g. factory worker) or tool can be utilized to make electrical contact with the exposed planar surface region 48 to allow the mobile charges (negative charges in this example) to be drained away to ground. This would mitigate an electrostatic discharge event due to a build up of mobile charges. As such, the configuration of the seal 38 facilitates a path to ground to drain charges from the conductive layer 40 so as to avoid an undesirable electrostatic discharge.

It is noted that in an embodiment where there is no secondary dielectric layer 66 utilized between the conductive layer 40 and the gasket layer 44, the configuration of the electrical charges would be expected to be similar to that as present in the embodiment shown in FIG. 7.

It is further noted that in an embodiment where the disk drive base 18 does not have any insulative coating as is conductive in nature, the configuration of the electrical charges would be similar to that as present in the embodiment shown in FIG. 7 however with a slight difference. In this regard, the positive charges of the disk drive base 18 would be more evenly dispersed throughout the disk drive base 18 rather than gathered at the surface.

Referring now to FIGS. 8-11, there is provided a seal 76 of another embodiment. The seal 76 includes a primary dielectric layer 78, a conductive layer 80, and a gasket layer 82. In this embodiment, the primary dielectric layer 78 is disposed between the conductive layer 80 and the gasket layer 82. A secondary dielectric layer 84 may be provided on top of the conductive layer 80 with the conductive layer 80 being between the primary and secondary dielectric layers 78, 84.

As depicted in FIGS. 10 and 11, the conductive layer 80 has a covered surface region 86 and an exposed planar surface region 88. The exposed planar surface region 88 is lacking a dielectric coating disposed thereon. As depicted in FIG. 9, the primary dielectric layer 78 includes an adhesive coating 90 disposed between the primary dielectric layer 78 and the covered surface region 86.

In further detail, the primary dielectric layer 78 has first and second primary dielectric layer sides 92, 94. The conductive layer 80 has first and second conductive layer sides 96, 98. The adhesive coating 90 is disposed at the second primary dielectric layer side 94. This allows the second primary dielectric layer side 94 to be attached to the first conductive layer side 96. The gasket layer 82 includes first and second adhesive gasket layer sides 100, 102. The gasket layer 82 further includes a gasket opening 104 disposed through the gasket layer 82. The first primary dielectric layer side 92 is attached to the second adhesive gasket layer side 102. The secondary dielectric layer 84 has first and second sides 106, 108. As depicted in FIG. 11, the secondary dielectric layer 84 may include an adhesive coating 110 between the secondary dielectric layer 84 and the conductive layer 80. This allows the first side 106 to be attached to the second conductive layer side 98.

According to various embodiments, the exposed planar surface region 88 may be parallel to but extends beyond the gasket layer 82, such as depicted in FIGS. 10 and 11. For example, the exposed planar surface region 88 may extend beyond the gasket layer 82 by at least 1 millimeter.

The exposed planar surface region 88 provides a contact for an electrical connection to the conductive layer 80. During the peeling action of the removal process of the seal 76 from the disk drive base 18, a grounded person (e.g. factory worker) or tool (not shown) can be utilized to make electrical contact with the exposed planar surface region 88 to allow the mobile charges (negative charges in this example) to be drained away to ground. Such a grounded tool may take the form of conductive metal tweezers that are connected to an electrical ground. The exposed planar surface region 88 does not have any adhesive upon it and is disposed towards the disk drive base 18. This would conveniently allow such tooling as tweezers to engage the seal 76 by pinching the tab-like portion of the seal 76 about the second secondary dielectric layer side 108 and the first conductive layer side 96 at the exposed planar surface region 88. While the exposed planar surface region 88 is formed as a tab-like portion of the seal 76, the exposed planar surface region 88 may be of a variety of shapes, geometries and locations. The primary dielectric layer 78, the conductive layer 80, the secondary dielectric layer 84, and the gasket layer 82 may have a variety of shapes, sizes, thicknesses and geometries and may be formed of a variety of materials such as the primary dielectric layer 42, the conductive layer 40, the secondary dielectric layer 66, and the gasket layer 44 as discussed above.

What is claimed is:

1. A seal for covering a hole in a disk drive housing, the seal comprising:

a conductive layer having a covered surface region and an exposed planar surface region, the exposed planar surface region lacking a dielectric coating disposed thereon;

a primary dielectric layer including an adhesive coating disposed between the primary dielectric layer and the covered surface region;

a gasket layer including a first adhesive gasket layer side and a gasket opening disposed through the gasket layer, the gasket opening sized to be disposed about the hole in the disk drive housing with the first adhesive gasket layer side attachable to the disk drive housing; and a secondary dielectric layer disposed between the conductive layer and the gasket layer;

wherein the conductive layer is disposed between the primary dielectric layer and the gasket layer; and wherein the secondary dielectric layer includes an adhesive coating between the secondary dielectric layer and the conductive layer.

2. A seal for covering a hole in a disk drive housing, the seal comprising:

a conductive layer having a covered surface region and an exposed planar surface region, the exposed planar surface region lacking a dielectric coating disposed thereon;

a primary dielectric layer including an adhesive coating disposed between the primary dielectric layer and the covered surface region;

a gasket layer including a first adhesive gasket layer side and a gasket opening disposed through the gasket layer, the gasket opening sized to be disposed about the hole in the disk drive housing with the first adhesive gasket layer side attachable to the disk drive housing; and a secondary dielectric layer disposed between the conductive layer and the gasket layer;

wherein the conductive layer is disposed between the primary dielectric layer and the gasket layer; and wherein the primary dielectric layer has a thickness between 13 and 250 microns, and the secondary dielectric layer has a thickness between 13 and 250 microns.

3. A seal for covering a hole in a disk drive housing, the seal comprising:

a conductive layer having a covered surface region and an exposed planar surface region, the exposed planar surface region lacking a dielectric coating disposed thereon;

a primary dielectric layer including an adhesive coating disposed between the primary dielectric layer and the covered surface region; and a gasket layer including a first adhesive gasket layer side and a gasket opening disposed through the gasket layer, the gasket opening sized to be disposed about the hole in the disk drive housing with the first adhesive gasket layer side attachable to the disk drive housing;

wherein the conductive layer has a thickness between 20 and 50 microns.

4. A seal for covering a hole in a disk drive housing, the seal comprising:

a conductive layer having a covered surface region and an exposed planar surface region, the exposed planar surface region lacking a dielectric coating disposed thereon;

a primary dielectric layer including an adhesive coating disposed between the primary dielectric layer and the covered surface region; and a gasket layer including a first adhesive gasket layer side and a gasket opening disposed through the gasket layer, the gasket opening sized to be disposed about the hole in the disk drive housing with the first adhesive gasket layer side attachable to the disk drive housing;

wherein the primary dielectric layer has a thickness between 13 and 250 microns.

5. A seal for covering a hole in a disk drive housing, the seal comprising:

a conductive layer having a covered surface region and an exposed planar surface region, the exposed planar surface region lacking a dielectric coating disposed thereon;

a primary dielectric layer including an adhesive coating disposed between the primary dielectric layer and the covered surface region; and a gasket layer including a first adhesive gasket layer side and a gasket opening disposed through the gasket layer, the gasket opening sized to be disposed about the hole in the disk drive housing with the first adhesive gasket layer side attachable to the disk drive housing;

wherein the gasket layer has a thickness between 35 and 220 microns.

6. A seal for covering a hole in a disk drive housing, the seal comprising:

a conductive layer having a covered surface region and an exposed planar surface region, the exposed planar surface region lacking a dielectric coating disposed thereon;

a primary dielectric layer including an adhesive coating disposed between the primary dielectric layer and the covered surface region; and a gasket layer including a first adhesive gasket layer side and a gasket opening disposed through the gasket layer, the gasket opening sized to be disposed about the hole in the disk drive housing with the first adhesive gasket layer side attachable to the disk drive housing;

wherein the primary dielectric layer is disposed between the conductive layer and the gasket layer.

7. The seal of claim 6 wherein the exposed planar surface region is parallel to but extends beyond the gasket layer.

8. The seal of claim 6 wherein the exposed planar surface region extends beyond the gasket layer by at least 1 millimeter.

9. The seal of claim 8 further comprising a secondary dielectric layer with the conductive layer disposed between the primary and secondary dielectric layers.

10. The seal of claim 9 wherein the secondary dielectric layer includes an adhesive coating between the secondary dielectric layer and the conductive layer.

11. The seal of claim 6 wherein the conductive layer has a thickness between 20 and 50 microns, the primary dielectric layer has a thickness between 13 and 250 microns, and the gasket layer has a thickness between 35 and 220 microns.

12. The seal of claim 6 wherein the gasket layer further includes a second gasket layer side that opposes the first adhesive gasket layer side, and the primary dielectric layer is attached to the second gasket layer side.

13. The seal of claim 6 wherein the exposed planar surface region is parallel to but extends beyond the primary dielectric layer.

14. The seal of claim 13 wherein the exposed planar surface region extends beyond the primary dielectric layer by at least 1 millimeter.

* * * * *